United States Patent
Kuttruff et al.

(10) Patent No.: US 6,836,208 B2
(45) Date of Patent: Dec. 28, 2004

(54) CONTACTLESS DATA TRANSMISSION SYSTEM AND METHOD FOR CONTACTLESS DATA TRANSMISSION

(75) Inventors: Jürgen Kuttruff, München (DE); Robert Reiner, Neubiberg (DE)

(73) Assignee: Infineon Technologies AG, Munich (DE)

( * ) Notice: Subject to any disclaimer, the term of this patent is extended or adjusted under 35 U.S.C. 154(b) by 444 days.

(21) Appl. No.: 09/918,892

(22) Filed: Jul. 30, 2001

(65) Prior Publication Data

US 2002/0080864 A1 Jun. 27, 2002

Related U.S. Application Data

(63) Continuation of application No. PCT/EP00/00636, filed on Jan. 25, 2000.

(30) Foreign Application Priority Data

Jan. 29, 1999 (EP) .............................................. 99101539

(51) Int. Cl.[7] .............................................. H04Q 1/00
(52) U.S. Cl. .............................. 340/10.51; 340/825.22; 340/10.3
(58) Field of Search .............................. 340/10.3, 10.4, 340/10.5, 825.22

(56) References Cited

U.S. PATENT DOCUMENTS

| | | | | |
|---|---|---|---|---|
| 3,870,993 A | * | 3/1975 | Biagi et al. | 342/47 |
| 4,027,307 A | * | 5/1977 | Litchford | 342/39 |
| 5,235,326 A | | 8/1993 | Beigel et al. | |
| 5,451,958 A | * | 9/1995 | Schuermann | 342/42 |
| 5,602,744 A | * | 2/1997 | Meek et al. | 340/870.02 |
| 6,107,910 A | * | 8/2000 | Nysen | 340/10.1 |

FOREIGN PATENT DOCUMENTS

| | | |
|---|---|---|
| EP | 0 170 716 A1 | 2/1986 |
| EP | 0 297 688 A1 | 1/1989 |
| EP | 0 492 482 A2 | 7/1992 |
| WO | WO 96/29673 | 9/1996 |
| WO | WO 98/29830 | 7/1998 |

OTHER PUBLICATIONS

ISO norms as listed in the specification, ISO 10536, ISO 14443 and 15693.

* cited by examiner

Primary Examiner—Brian Zimmerman
(74) Attorney, Agent, or Firm—Laurence A. Greenberg; Werner H. Stemer; Ralph E. Locher

(57) ABSTRACT

A contactless data transmission system having a transponder and a write/read station, between which data can be exchanged by a HF signal. The transponder includes a receiver unit having a receiving interface for accepting the HF signal and having an output terminal providing a data signal formed from the HF signal. The receiver unit has means for receiving and processing at least two differently modulated and/or encoded HF signals. The transponder also includes a processing unit having a first input terminal that is connected to the output terminal of the receiver unit. The transponder also includes a detection unit for providing a control signal dependent on the performance of the received HF signal. The receiver unit and/or the processing unit can be controlled or driven dependent on the control signal.

18 Claims, 4 Drawing Sheets

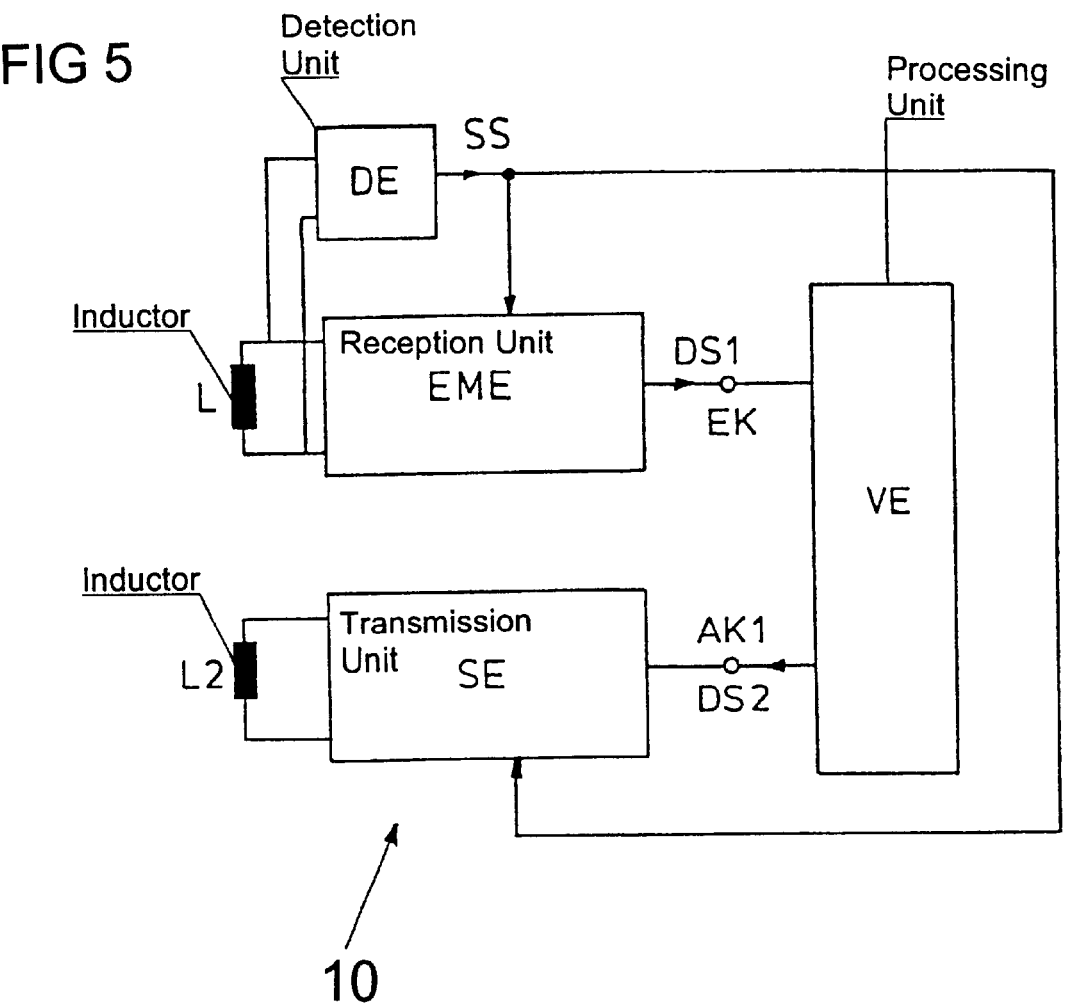

CONTACTLESS DATA TRANSMISSION SYSTEM AND METHOD FOR CONTACTLESS DATA TRANSMISSION

CROSS-REFERENCE TO RELATED APPLICATION

This application is a continuation of copending International Application No. PCT/EP00/00636, filed Jan. 25, 2000, which designated the United States.

BACKGROUND OF THE INVENTION

Field of the Invention

The present invention relates to a contactless data transmission system that is particularly suitable for transmission systems having what are referred to as contactless chip cards. These systems make it possible to exchange data between the chip card and a predominately stationary write/read station for identifying the owner of the card, for effecting a cashless payment, or related purposes.

There are different transmission methods for exchanging data between the chip card and the write/read device. These transmission methods are the subject matter of different partially unfinished standards. Among other things, these standards, such as the ISO/IEC 10536, ISO/IEC 14443 or ISO/IEC 15693, prescribe the data rate of the exchanged data, their coding, the type of modulation, and the carrier frequency of the transmitted signals.

Hitherto, there have been different chip chards and write/read devices, which particularly differ in the maximum permissible distance between the card and the write/read device. Systems for the "proximity range" function up to distances of approximately 10 cm, while systems for the "vicinity range" function up to a distance of approximately 1 m.

International publication WO 96/29673 discloses a transponder for a chip card. From the properties of the received electromagnetic wave, the transponder determines the standard with which the write-read device works. The transponder is adjusted with respect to the recognized standard. The stereo effect is used for recognizing whether the transponder is situated in the proximity field or the vicinity field.

A disadvantage of this known system is that while, the transponder can be operated by using a number of standards, the standard that is most suitable for the transponder is not taken into consideration.

SUMMARY OF THE INVENTION

It is accordingly an object of the invention to provide a contactless data transmission system and a method for operating the system which overcomes the above-mentioned disadvantageous of the prior art apparatus and methods of this general type. In particular, it is an object of the invention to provide a contactless data transmission device having a transponder, whereby the standard that is suitable for the transponder can be selected.

With the foregoing and other objects in view there is provided, in accordance with the invention, a contactless data transmission system that includes a transponder; and a write/read station for generating HF signals to exchange data with the transponder. The transponder includes a reception unit including a receiving interface for receiving the HF signals generated by the write/read station and for thereby obtaining received HF signals. The reception unit has an output terminal for providing data signals that are formed from the received HF signals. The reception unit includes a device for receiving and processing at least two signals selected from the group consisting of differently modulated ones of the received HF signals and differently encoded ones of the received HF signals. The transponder also includes a processing unit including a first input terminal that is connected to the output terminal of the reception unit. The transponder also includes a detection unit for providing a control signal dependent on the performance of the received HF signal. The transponder also includes a transmission unit that is driven dependent on the control signal. The transmission unit is for generating a HF signal that is selected from the group consisting of a signal that is modulated in a first manner, a signal that is modulated in a second manner, a signal that is encoded in a first manner, and a signal that is encoded in a second manner. A unit that is selected from the group consisting of the reception unit and the processing unit is driven dependent on the control signal.

In other words, the transponder or, respectively, the chip card of the transmission system has a reception unit with a receiving interface for receiving a HF signal transmitted by the write/read station. The reception unit has an output terminal for providing a data signal formed in the reception unit from the HF signal. The reception unit has means for receiving and processing HF signals that are differently modulated and/or encoded. The reception unit is particularly appropriate for receiving, demodulating and decoding HF signals, which have been produced and transmitted according to one or more of the already existing transmission standards. The reception unit is followed by a processing unit for processing the data signal acquired from the HF signal.

Furthermore, the transponder has a detector unit for providing a control signal that is dependent on the performance of the received HF signal. The reception unit and/or the processing unit can be driven by the control signal. The control signal has information about the performance of the received HF signal and therefore about the distance of the chip card from the write/read station. Dependent on the intensity of the received HF signal, the transponder of the inventive transmission system enables the reception unit and/or the processing unit to be adjusted to the transmission method that is optimal for the determined distance between the chip card and the write/read device.

In accordance with an added feature of the invention, the transponder has a transmission unit, which is connected to the processing unit and which has means for generating at least two differently modulated and/or encoded HF signals from a data signal supplied by the processing unit. The transmission unit can be preferably driven dependent on the control signal for generating differently modulated and/or encoded HF signals, which belong to different transmission standards.

If during a data transmission that is based on a first transmission method which requires a small distance between the chip card and the write/read device, for example as a result of a high data rate, the user moves away from the read/write device, then by changing over to another transmission method, which still securely functions even with respect to larger distances, the started data transmission can be completed or at least can be interrupted without data loss.

The modulation methods and encoding methods used by the reception unit and the transmission unit are particularly based on transmission standards, which have been created for different distances between the chip card and the write/read device. These standards are particularly different with respect to the data rate, which is greater for the proximity range (according to ISO 1443) than for the vicinity range (according to ISO 15693).

In accordance with an additional feature of the invention, the detection unit is connected directly to the reception unit in order to drive the reception unit in dependence on the control signal. In another embodiment, the detection unit is connected to the processing unit and the reception unit is connected to the processing unit in order to drive the reception unit dependent on the control signal via the processing unit. This embodiment has the advantage that the processing unit recognizes from the control signal whether it is necessary to change the transmission method, since the chip card has been removed from the write/read device, for example. Alternatively, the processing unit can recognize that it is possible to change over to a transmission method having a higher data rate, since the chip card has been further approximated to the write/read device. Subsequently, the processing unit can adapt the transmission unit and the reception unit to the modified requirements and the respective transmission method according to the processing of the received data signal and the data to be transmitted to the write/read station. This embodiment has the additional advantage that further parameters, which make a change of the transmission method appear necessary, can be considered in the processing unit in addition to the control signal.

In accordance with another feature of the invention, the reception unit preferably has at least two signal processing units for receiving and processing two differently modulated and/or encoded HF signals. The signal processing units each have a receiver, a demodulator and a decoder. Dependent on how the HF signals to be processed differ, the signal processing units can have one or more of the components in common. For example, if the HF signals differ only with respect to the type of modulation and encoding but not with respect to the carrier frequency, one receiver that is tuned to the carrier frequency and that can be common to both signal processing units is sufficient. If the two signals differ only with respect to their encoding, the receiver and demodulator can be used together.

In accordance with a further feature of the invention, for adjusting the reception unit to the processing of one of the possible HF signals, the components of the signal processing units preferably can be individually driven dependent on the control signal. The components that are not needed are preferably switched off in order so save current.

In accordance with a further added feature of the invention, for generating the control signal, the detection unit is preferably connected to an output terminal of the reception unit. In addition to the means for demodulating and decoding the HF signals, the reception unit has a voltage supply unit with a voltage regulator, which provides a supply voltage for the switching components of the transponder by rectifying and smoothing the HF signal. A voltage regulator serves the purpose of maintaining an at least approximately constant supply voltage. Voltage fluctuations as a result of a powerful HF signal are adjusted by the voltage regulator. Therefore, the voltage regulator has information about the performance of the received HF signal. The information can be supplied to the detection unit for forming the control signal (as is provided in an embodiment of the invention).

In accordance with a further additional feature of the invention, the write/read device has means for receiving a signal transmitted by the transponder and for changing the transmission method dependent on the received signal. The write/read device of the inventive transmission system preferably has a configuration, which corresponds to the transponder and includes a reception unit, a processing unit and a transmission unit. This reception unit has means for receiving and processing HF signals, which are modulated and/or encoded in at least two different ways. The transmission unit preferably has means for generating corresponding differently modulated and/or encoded HF signals.

In accordance with yet an added feature of the invention, in a further embodiment of the invention, the write/read device has means for determining an error rate of the signals received by the transponder and has means for changing the transmission method dependent on the error rate.

In accordance with yet an additional feature of the invention, the transponder of the inventive system also can be operated in connection with a write/read device that does not have all of transmission methods implemented that are implemented in the transponder. As a result, however, it is not possible to switch between all of the transmission methods that are possible for the transponder. The processing unit of the transponder is preferably fashioned such that it only allows a changeover to such a transmission method for which a corresponding request signal is received by the write/read device.

With the foregoing and other objects in view there is also provided, in accordance with the invention, a process for operating the above-described transmission system. In the process, a transmission method is initially adjusted in the system at the beginning of the transmission, when the processing unit is charged with the supply voltage. The transmission method functions reliably also regarding larger distances between the transponder and the chip card, and provides that the transmission method is subsequently adjusted dependent on the control signal.

Other features which are considered as characteristic for the invention are set forth in the appended claims.

Although the invention is illustrated and described herein as embodied in a contactless data transmission system and method for the contactless data transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 5 shows a block diagram of a write/read device.

DESCRIPTION OF THE PREFERRED EMBODIMENTS

Figure 1:
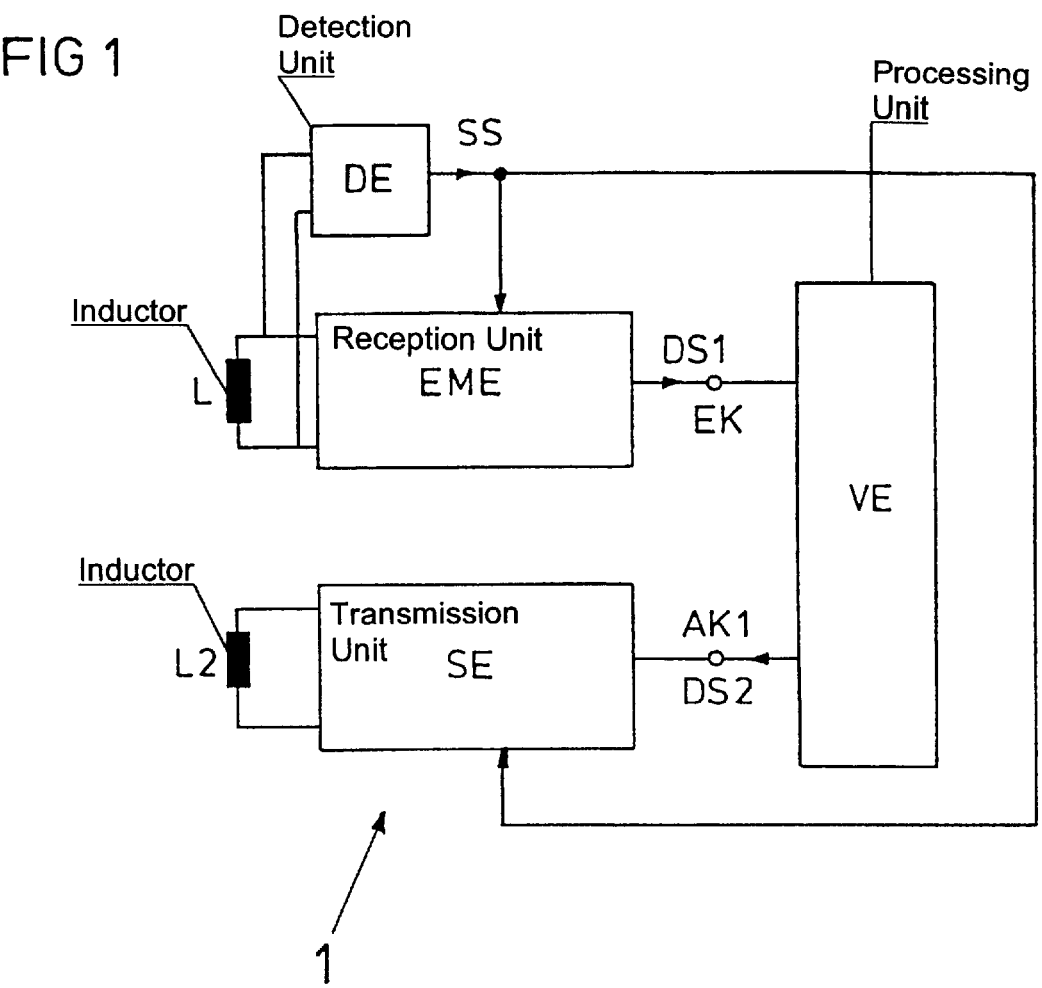
FIG. 1 shows a block diagram of a transponder of a transmission system.

Referring to the figures of the drawing in detail and first, particularly, to FIG. 1 thereof, there is shown a block diagram of a transponder 1 of an inventive transmission unit.

The transponder is suitable for exchanging data with a write/read station according to different transmission standards. For this purpose, the transponder has a reception unit EME with a receiving interface in the form of a receiving coil L and which accepts HF (high-frequency) signals sent by a write/read station. A first data signal DS1, which is produced from the HF signal, is supplied from an output terminal of the reception unit EME to an input terminal EK of a processing unit VE. The transponder has a transmission unit SE with a transmission interface fashioned as a transmission coil L2 for transmitting data of the transponder 1 to the write/read device. The processing unit VE supplies the data to be transmitted to the transmission unit in the form of a second data signal DS2 via an output terminal AK1.

At should also be mentioned that the reception unit EME and the transmission unit SE can share a common coil that acts as a transmission coil and a reception coil.

The transmission unit and the reception unit are constructed for receiving and for processing, or respectively, generating at least two differently modulated and/or encoded HF signals. The differently modulated and/or encoded HF signals belong to different transmission standards, which can be used by the transponder due to its structure and via which the transponder can communicate with a write/read device that implements at least one of these transmission standards.

The transmission standards can differ with respect to the utilized modulation and encoding, the maximum data rate, and also with respect to the carrier frequency. In particular, different transmission standards are suitable for different ranges, namely for different distances between the transponder and the write/read device. For example, the transmission standard for the proximity range, according to ISO 14443, is only appropriate for ranges of up to a maximum of 10 cm, whereas the transmission standard for the vicinity range, according to ISO 15693, is appropriate for ranges of up to 1 m.

Given the inventive transmission system, the transmission method is selected dependent on the performance of the received HF signals, which gives information about the distance of the chip card or, respectively, of the transponder from the write/read device.

The transponder 1 has a detection unit DE generating a control signal SS dependent on the performance of the received HF signal. The control signal SS serves the purpose of driving the transmission unit SE and the reception unit EME and of selecting the transmission method. In the exemplary embodiment shown in FIG. 1, the transmission unit SE and the reception unit EME are driven directly by the control signal SS. In the shown example, the detection unit DE, for generating the control signal SS, is connected directly to the receiving interface L of the reception unit EME for evaluating the received performance.

Figure 2:
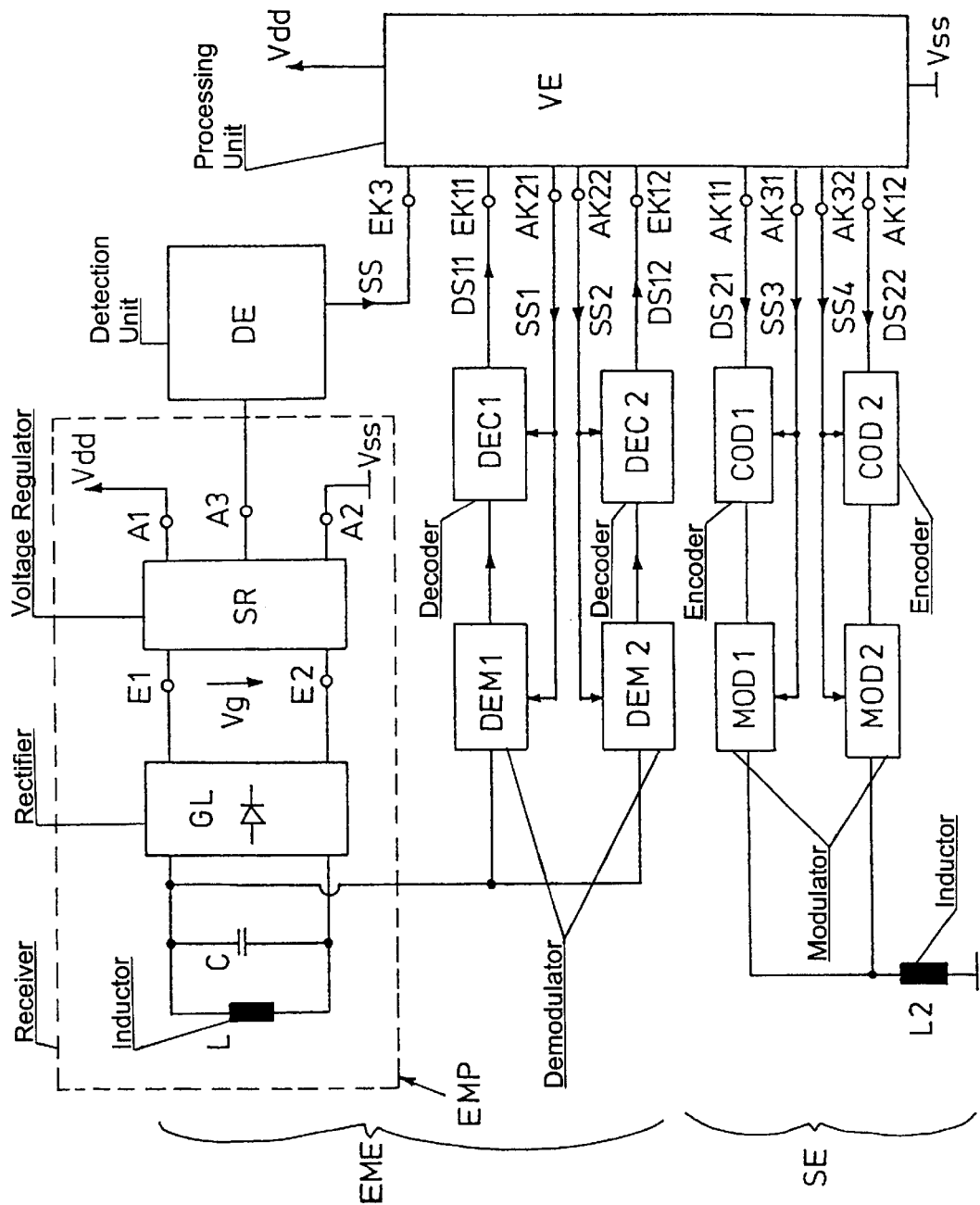
FIG. 2 shows a block diagram of a transponder in which the reception unit has been shown in detail.

FIG. 2 shows another embodiment of the inventive transponder having a reception unit EME, a transmission unit SE, a processing unit VE and a detection unit DE.

The reception unit EME has a first and second signal processing unit, which share a common receiver EMP and which each have a demodulator DEM1, DEM2 and a decoder DEC1, DEC2. The outputs of the decoders DEC1, DEC2 are connected to the respective input terminals EK11, EK12 of the processing unit VE for feeding in data signals DS11, DS12. The receiver EMP has an input resonant circuit composed of a coil L and a capacitor C connected parallel thereto. This parallel connection is followed by a rectifier GL, which, in turn, is followed by a voltage regulator SR. The output terminals A1, A2 of the voltage regulator SR provide different potentials Vdd, Vss, whose difference results in a supply voltage for the switching components of the transponder. For the sake of clarity, FIG. 2 only shows that the processing unit VE is connected to the supply potentials. The other components such as the demodulators DEM1, DEM2 and the decoders DEC1, DEC2 certainly are also connected to the voltage supply.

In the embodiment as shown in FIG. 2, the detection unit DE is connected to the processing unit VE for supplying the control signal SS. The demodulators DEM1, DEM2 and the decoders DEC1, DEC2 of the reception unit EME are driven by control signals SS1, SS2, which, in this embodiment, are generated by the processing unit VE in dependence on the control signal SS. The demodulator DEM1 and the decoder DEC1 of the first signal processing unit are connected to an output terminal AK21 of the processing unit VE for controlling the demodulator DEM1 and the decoder DEC1. The demodulator DEM2 and the decoder DEC2 of the second processing unit are connected to a further output terminal AK22 of the processing unit VE for controlling the demodulator DEM2 and the decoder DEC2.

The transmission unit SE has two signal processing units, which each have an encoder COD1, COD2 and a modulator MOD1, MOD2 and which share a common transmission coil L2 that is driven by the modulators MOD1, MOD2. The transmission unit SE serves the purpose of generating a HF signal from a data signal DS21, DS22, which is supplied to the signal processing units via outputs AK11, AK12 of the processing unit VE. The modulators MOD1, MOD2 and the encoders COD1, COD2 are also connected to respective outputs AK31 and AK32 of the processing unit VE and they can be controlled or driven in dependence on the control signals SS3, SS4, which are generated in the processing unit VE in dependence on the control signal SS.

The demodulators DEM1, DEM2 and the decoders DEC1, DEC2 of the signal processing units of the reception unit EME and the encoders COD1, COD2 and the modulators MOD1, MOD1 of the signal processing units of the transmission unit SE serve the purpose of receiving and processing, or respectively, of generating HF signals according to one of the possible standards. The shown transponder is capable of processing two differently modulated and encoded signals, so that a transmission is possible according to two standards. It is possible to implement more than two methods by providing additional signal processing units in the reception unit EME and in the transmission unit SE.

The demodulators DEM1, DEM2, the decoders DEC1, DEC2, the encoders COD1, COD2 and the modulators MOD1, MOD2 are preferably controlled or driven such that the components for the transmission method, which is currently not used, are switched off. In order to prevent the data of one of the two signal processing units of the reception unit EME from reaching the processing unit VE, it would be sufficient to switch off only one of the components, namely the respective demodulator DEM1; DEM2 or the respective decoder DEC1; DEC2. The same is true for the modulators MOD1, MOD2 and the encoders COD1, COD2 of the signal processing units of the transmission unit SE, whereby the ones that are currently not necessary for the method are switched off. At the beginning of a signal reception by the transponder, it is possible to activate all of the provided demodulators and decoders and to simultaneously evaluate the received data in the processing unit VE. Dependent on the applied transmission method, only one of the demodulator-decoder combinations supplies a valid data signal, which is recognized as such by the processing unit VE. The information about which of the demodulator-decoder combinations supplies the valid result and therefore which method is applied by the write/read device can be used in the processing unit VE, together with the control signal SS, for deciding whether the transmission method must be changed.

Figure 3:
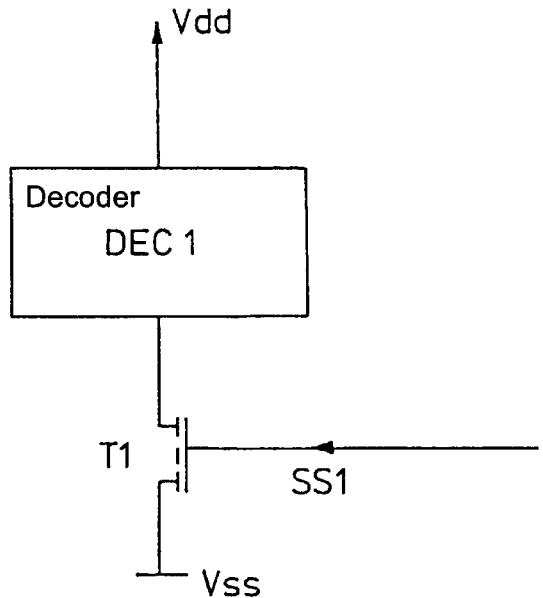
FIG. 3 shows a switch for controlling a component of the reception unit.

As shown in the example in FIG. 3 for a decoder DEC1, the demodulators or decoders are driven via its supply voltage connection. A switch T1 is switched between a supply connection of the decoder DEC1 and a terminal for the supply potential Vss. The switch is opened and closed and the decoder DEC1 therefore is switched on and switched off dependent on the control signal SS1, which is generated in the processing unit VE dependent on the control signal SS of the detection unit DE. It is provided in another embodiment (not shown) to stop a clock supply, which is supplied to the function unit to be switched off, instead of or together with the voltage supply.

It is assumed in the exemplary embodiment as shown in FIG. 2 that two differently modulated and encoded HF signals are received by the reception unit EME and are converted into data signals DS11, DS12 after the demodulation and decoding.

Dependent on the used transmission standard, the demodulator DEM1 and the decoder DEC1 or the demodulator DEM2 and the decoder DEC2 are active. The signal processing units of the reception unit EME share a common receiver EMP, so the HF signals of the different transmission standards, which can be received and processed by the shown transponder, cannot have different carrier frequencies. If the received signals are to have different carrier frequencies, separate receivers must be provided. From the data signals DS21, DS22, the shown transmission unit SE generates differently modulated and encoded HF signals corresponding to the encoding methods and modulation methods implemented in the encoders COD1, COD2 and the modulators MOD1, MOD2. The transmission unit has only one transmission coil L2. This is particularly possible when the generated HF signals have the same carrier frequency. It is also possible to provide a number of transmission coils and reception coils, for example one transmission coil and reception coil for each transmission method that can be carried out by the transponder.

Figure 4:
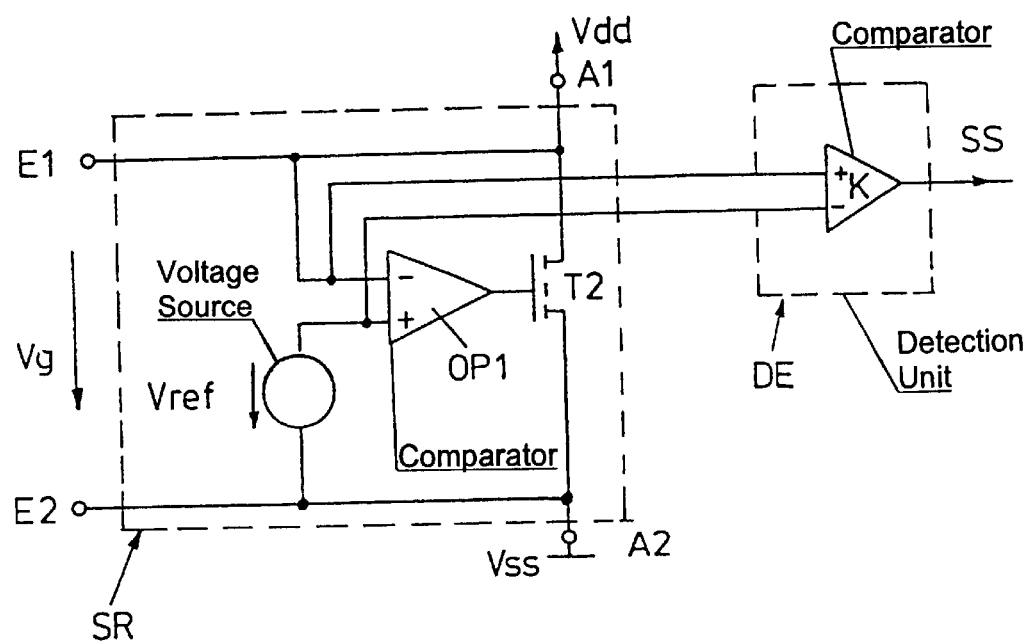
FIG. 4 shows a detailed illustration of a voltage regulator and a detection unit.

Given different transmission standards that use the same carrier frequency, such as the standards according to ISO 14443 and ISO 15693, the data is transmitted with different transmission rates, so that the bandwidth of the transmitted HF signals is different. It is necessary to adapt the receive bandwidth of the receiver in order to minimize the signal-to-noise ratio. This adaptation can occur, for example, by a variable load (not shown) that is switched between the output terminals of the rectifier GL in order to increase the load of the parallel resonant circuit formed by the coil L and the capacitor C. It is valid that the greater the load, the lower the receive bandwidth. The load can be adjusted dependent on the control signal SS, for example, whereby the control signal SS can be used for adjusting the load directly or after the processing by the processing unit. The voltage regulator SR, which is preceded by the rectifier GL, also presents a load. The greater the power draw of the components of the voltage regulator SR, the more the resonant circuit is loaded. The power draw of the circuit is increased when a transmission method having a high data rate and a correspondingly high processing speed is used, so that a higher load of the resonant circuit and therefore a lower transmission bandwidth results. Therefore, the bandwidth is partially automatically adapted to the transferable power particularly when the voltage regulator SR is fashioned as a parallel voltage regulator (as shown in FIG. 4).

The detection unit DE generates the control signal SS dependent on the intensity of the received HF signal. The reception unit EME, the processing unit VE and the transmission unit SE can be controlled or driven dependent on the control signal SS such that a changeover to a transmission standard occurs, which is particularly suitable for the determined distance between the transponder and the write/read device. This distance has been determined from the performance of the received signal. The transmission standard certainly can only be changed, for example when the chip card is removed from the write/read device and is in agreement with the write/read device as to the change. The read/write device, of course, must have the transmission standard implemented to which the changeover is to occur.

For generating the control signal SS, the detection unit DE is preferably connected to the voltage regulator SR of the receiver EMP. As shown in FIG. 4, the voltage regulator SR, in the most simple case, is composed of a reference voltage source Vref, a comparator OP1 and of a variable resistance T2. The operational amplifier OP1 compares the voltage, which is present between the output terminals of the rectifier and which is generated by rectifying the HF signal, with the reference voltage Vref. The value of resistance of the resistor T2 that is switched between the output terminals A1, A2 of the voltage regulator SR is adjusted dependent on the difference between Vg and Vref. The resistance becomes lower, the greater Vg becomes in relation to Vref. The value of the voltage Vg becomes greater, as the received HF signal becomes more powerful. The difference between the voltage Vg and the constant voltage Vref therefore is suitable as a measure for the intensity of the received HF signal. In the most simple case, the detection unit DE has a comparator K, which compares the voltage Vg with the voltage Vref and which, at its output, provides a digital control signal whose value is dependent on whether the voltage Vg is greater or lower than Vref. If Vg is greater than Vref, then an intense input level is assumed. If Vg is lower than Vref, then a weak input level is assumed. The comparator K can also be switched-on at a different location of the signal path in the voltage regulator in order to generate the control signal. The detection unit DE advantageously has a sample hold element assuring that short-term fluctuations of the voltage Vg are not forwarded as modifications of the control signal SS.

The shown detection unit DE, however, is suitable for selecting between only two transmission standards, for example between a transmission standard for the proximity range and for the vicinity range. In order to be able to select from more than two transmission standards dependent on the distance between the card and the write/read device, a detection unit is necessary, which, by means of a quantizer, for example, provides a control signal that can assume more than two values.

FIG. 5 shows the functional structure of a write/read device 10 having a transmission unit SE, reception unit EME and a processing unit VE. The structure essentially corresponds to the functional structure of the transponder, so that the read/write device 10 is not illustrated in greater detail.

The inventive subject matter also includes a method for contactless data transmission, as it can be particularly implemented by the inventive transmission system. According to the method, a transponder having a reception unit, a processing unit, a transmission unit and a detection unit is used. The reception unit and the transmission unit are designed for receiving and processing, or respectively, generating at least two differently modulated and/or encoded HF signals, as they are the subject matter of different transmission standards. In particular, the purpose of the method is to select the transmission method that is optimal, dependent on the distance between the transponder and the write/read station.

If the transponder is brought into the transmission range of a write/read station and if a HF signal is received by the receiver EMP, then the rectifier GL and the voltage regulator SR generate a supply voltage for the transmission unit SE, the reception unit EME and the processing unit VE. Initially, the transponder cannot recognize which transmission standard this HF signal is based on, since—as already mentioned—different transmission standards use the same carrier frequency. In a first embodiment of the method, when a supply voltage is present, the reception unit EME and possibly the transmission unit SE are initially adjusted for receiving and transmitting HF signals of the transmission standard that is most robust in regard to the distance between the write/read station and the transponder. This has the condition that the write/read station transmits request signals of the corresponding standard in regular time intervals for contacting the transponder. If the contact is created, a control signal that is dependent on the received performance of the HF signal, is subsequently available at the output of the detection unit DE. Depending on how close the chip card is to the write/read device, the transmission standard is changed by changing the signal processing units of the transmission unit SE and the reception unit EME—assuming that the write/read device has this standard.

As it has already been mentioned, it is also possible to simultaneously adjust the transponder such that it can receive signals transmitted by different methods in order to initially determine which transmission method is applied by the write/read device. The components that are not necessary for this method can be switched off or, respectively, the transmission method is changed dependent on the intensity of the received signal.

In another method for the first contact of the transponder with the write/read device, when supply voltage is present, the processing unit VE, successively controls the present signal processing units of the receiver EME until one of the signal processing units receives a valid signal, normally a request signal, from the write/read device.

Each of the signal processing units is designed for receiving and processing signals of a transmission method, whereby the signals of different standards normally differ with respect to the modulation and/or the encoding. The processing unit VE recognizes the transmission method used by the write/read station from the signal processing unit that is active at this moment. The processing unit VE subsequently selects the corresponding signal processing unit of the transmission unit SE in order to contact the write/read station. The transmission method can be changed, after the first contact has been created, dependent on the performance of the received HF signals.

The criteria for a changeover of the transmission method are deposited in the processing unit, which can be preferably programmed and which has a ROM or an EEPROM, for example. In particular, this has the advantage that the same hardware can be used in the transponder as for applications in which only one transmission method is to be used. The processing unit VE selects the applicable transmission methods, for which the hardware conditions are fulfilled on the transponder, by controlling the corresponding encoders COP1, COP2, modulators MOD1, MOD2, demodulators DEM1, DEM2 and decoders DEC1, DEC2.

If the performance received by the transponder changes and if it results—according to the rules deposited in the detection unit DE, or respectively, in the processing unit VE—that it is advantageous to change the transmission method, a corresponding code is transmitted to the write/read device, so that it can change over to the other transmission method.

We claim:

1. A contactless data transmission system, comprising:
   a transponder; and
   a write/read station for generating HF signals to exchange data with said transponder, said write/read station including a receiver/transmitter device;
   said transponder including:
   a receiver unit including a receiving interface for receiving the HF signals generated by said write/read station and for thereby obtaining received HF signals, said receiver unit having an output terminal for providing data signals that are formed from the received HF signals, said receiver unit including a device for receiving and processing at least two signals selected from the group consisting of differently modulated ones of the received HF signals and differently encoded ones of the received HF signals;
   a processing unit including a first input terminal connected to said output terminal of said receiver unit;
   a detection unit for providing a control signal dependent on a performance of the received HF signal;
   a transmission unit that is driven dependent on the control signal, said transmission unit for generating a HF signal that is selected from the group consisting of a signal that is modulated in a first manner, a signal that is modulated in a second manner, a signal that is encoded in a first manner, and a signal that is encoded in a second manner; and
   a unit selected from the group consisting of said receiver unit and said processing unit is driven dependent on the control signal; and
   said receiver/transmitter device receiving the HF signal generated by said transmission unit for obtaining a write/read station received signal, said receiver/transmitter device also generating the HF signals to exchange the data with said transponder; and
   said HF signals generated by said receiver/transmitter device being signals selected, in dependence on the write/read station received signal, from the group consisting of differently modulated HF signals and differently encoded HF signals.

2. The data transmission system according to claim 1, wherein:
   said processing unit includes an output terminal for providing a data signal having information;
   said transmission unit includes an input terminal that is connected to said output terminal of said processing unit for accepting the data signal having the information;
   said transmission unit includes a device for generating at least two different HF signals from the data signal having the information, the at least two different HF signals are selected from the group consisting of differently modulated HF signals and differently encoded HF signals; and
   said transmission unit includes a transmitting interface for transmitting the at least two different HF signals.

3. The data transmission system according to claim 1, wherein said detection unit is connected directly to a component selected from the group consisting of said receiver unit and said transmission unit for driving the selected component.

4. The data transmission system according to claim 1, wherein:
said detection unit is connected to said processing unit for supplying the control signal to said processing unit; and
said processing unit is connected to a component selected from the group consisting of said receiver unit and said transmission unit for driving the selected component.

5. The data transmission system according to claim 1, wherein:
said receiver unit includes at least two signal processing units defining a first signal processing unit and a second signal processing unit;
said first signal processing unit includes components;
said second signal processing unit includes components; and
said components of said first signal processing unit and said components of said second signal processing unit together include at least one receiver, at least one demodulator, and at least one decoder.

6. The data transmission system according to claim 5, wherein at least one of said components of said first signal processing unit and at least one of said components of said second signal processing unit is driven in dependence on the control signal.

7. The data transmission system according to claim 5, wherein a component selected from the group consisting of said receiver, said demodulator, and said decoder is shared between said at least two signal processing units.

8. The data transmission system according to claim 7, wherein at least one of said components of said first signal processing unit and at least one of said components of said second signal processing unit is driven in dependence on the control signal.

9. The data transmission system according to claim 1, wherein:
said receiver unit includes an output terminal; and
said detection unit is connected to said output terminal of said receiver unit.

10. The data transmission system according to claim 1, wherein:
said receiver unit includes at least one voltage regulator for providing a supply voltage; and
said detection unit is connected to said voltage regulator.

11. The data transmission system according to claim 1, wherein said receiver unit has a bandwidth that is adjustable in dependence on the control signal.

12. The data transmission system according to claim 1, wherein:
said transmission unit includes two signal processing units defining a first signal processing unit and a second signal processing unit;
said first signal processing unit includes components;
said second signal processing unit includes components; and
said components of said first signal processing unit and said components of said second signal processing unit together include at least one encoder, at least one modulator, and at least one transmitter.

13. The data transmission system according to claim 12, wherein a component selected from the group consisting of said encoder, said modulator, and said transmitter is shared between said at least two signal processing units.

14. A method for operating the data transmission system according to claim 1, which comprises:
acquiring a receiving field strength at said transponder;
generating the control signal in said transponder dependent on a receiving field strength; and
adjusting a modulation type in said transmission unit of said transponder, in dependence on the control signal in said transponder.

15. A contactless data transmission system, comprising:
a transponder; and
a write/read station for generating HF signals to exchange data with said transponder, said write/read station including a receiver device;
said transponder including:
a receiver unit including a receiving interface for receiving the HF signals generated by said write/read station and for obtaining received HF signals, said receiver unit having an output terminal for providing data signals formed from the received HF signals, said receiver unit including a device for receiving and processing at least two signals selected from the group consisting of differently modulated ones of the received HF signals and differently encoded ones of the received HF signals;
a processing unit including a first input terminal connected to said output terminal of said receiver unit;
a detection unit for providing a control signal dependent on a performance of the received HF signal;
a transmission unit driven dependent on the control signal, said transmission unit for generating a HF signal selected from the group consisting of a signal modulated in a first manner, a signal modulated in a second manner, a signal encoded in a first manner, and a signal encoded in a second manner; and
a unit selected from the group consisting of said receiver unit and said processing unit being driven dependent on the control signal;
said receiver device receiving the HF signal generated by said transmission unit of said transponder and for obtaining a write/read station received signal having an error rate; and
said write/read station including a device evaluating the error rate of the write/read station received signal and generating signals selected, in dependence on the error rate, from the group consisting of differently modulated HF signals and differently encoded HF signals.

16. A method for operating the data transmission system according to claim 15, which comprises:
acquiring a receiving field strength at said transponder;
generating the control signal in said transponder dependent on a receiving field strength; and
adjusting a modulation type in said transmission unit of said transponder, in dependence on the control signal in said transponder.

17. A contactless data transmission system, comprising:
a transponder; and
a write/read station for generating HF signals to exchange data with said transponder, said write/read station including a receiver unit;
said transponder including:
a receiver unit including a receiving interface for receiving the HF signals generated by said write/read station and for obtaining received HF signals, said receiver unit having an output terminal for providing data signals formed from the received HF signals, said receiver unit including a device for receiving and processing at least two signals selected from the group consisting of differently modulated ones of the received HF signals and differently encoded ones of the received HF signals;

a processing unit including a first input terminal connected to said output terminal of said receiver unit;

a detection unit for providing a control signal dependent on a performance of the received HF signal;

a transmission unit driven dependent on the control signal, said transmission unit for generating a HF signal selected from the group consisting of a signal modulated in a first manner, a signal modulated in a second manner, a signal encoded in a first manner, and a signal encoded in a second manner; and a unit selected from the group consisting of said receiver unit and said processing unit being driven dependent on the control signal;

said receiver unit receiving the HF signal generated by said transmission unit of said transponder and for obtaining a write/read station received signal;

said write/read station including a processing unit preceded by said receiver unit;

said write/read station including a detection unit for providing a control signal dependent on a performance of the received write/read signal; and a unit selected from the group consisting of said receiver unit of said write/read station and said processing unit of said write/read station being driven in dependence on the control signal from the detection unit of said write/read station.

18. A method for operating the data transmission system according to claim 17, which comprises:

acquiring a receiving field strength at said transponder;

generating the control signal in said transponder dependent on a receiving field strength; and adjusting a modulation type in said transmission unit of said transponder, in dependence on the control signal in said transponder.

* * * * *